United States Patent
Hollis et al.

(10) Patent No.: US 6,201,252 B1
(45) Date of Patent: *Mar. 13, 2001

(54) FIFTH WHEEL KING PIN RELEASE MECHANISM

(76) Inventors: William E. Hollis, 215 Hielendale Rd.; William E. Hollis, Jr., 109 Wescott Dr., both of Pittsburgh, PA (US) 15237

( * ) Notice: Subject to any disclaimer, the term of this patent is extended or adjusted under 35 U.S.C. 154(b) by 0 days.

This patent is subject to a terminal disclaimer.

(21) Appl. No.: 09/154,421

(22) Filed: Jun. 25, 1998

Related U.S. Application Data

(63) Continuation-in-part of application No. 08/589,421, filed on Jan. 22, 1996, now abandoned.

(51) Int. Cl.$^7$ .................................................. B62D 53/08
(52) U.S. Cl. ............................. 250/433; 16/427; 74/544
(58) Field of Search ................................... 280/433, 434, 280/407, 441; 254/129; 74/544; 16/115

(56) References Cited

U.S. PATENT DOCUMENTS

| | | | |
|---|---|---|---|
| 2,581,254 | * | 1/1952 | Greenawalt . |
| 3,239,241 | * | 3/1966 | Worden . |
| 4,251,089 | * | 2/1981 | Skaggs ................................. 280/433 |
| 5,378,007 | * | 1/1995 | Joyce .................................. 280/433 |
| 5,423,567 | * | 6/1995 | Upton .................................. 280/433 |
| 5,863,060 | * | 1/1999 | Hollis et al. ........................ 280/433 |

FOREIGN PATENT DOCUMENTS

355154 * 8/1905 (FR) .................................... 280/433

* cited by examiner

*Primary Examiner*—Anne Marie Boehler
(74) *Attorney, Agent, or Firm*—James Ray & Associates

(57) ABSTRACT

A manual release apparatus attachable to a fifth wheel of a truck cab for disengaging a king pin on a truck trailer from the fifth wheel, including an elongated, rigid lever arm, a first end of which is pivotally attached to a side of the fifth wheel at a location spaced from the opening through which the release rod extends, a second end of which is spaced away from the fifth wheel extending horizontally from the first end, whereby the lever arm is attached to the release rod, such that a manual movement of the second end of the lever arm will cause the lever arm to be pivoted horizontally about the first end, thereby causing the release rod to be pulled outwardly to disengage the king pin from the fifth wheel.

9 Claims, 4 Drawing Sheets

FIFTH WHEEL KING PIN RELEASE MECHANISM

CROSS REFERENCE TO RELATED APPLICATIONS

This is a Continuation-In-Part application of application Ser. No. 08/589,421, filed Jan. 22, 1996, and now abandoned.

FIELD OF THE INVENTION

This invention relates generally to articulated semi-trailer trucks and the interconnection between the cab and trailer. More particularly, this invention relates to a unique and improved lever apparatus permanently mounted to the fifth wheel of a truck cab for quickly, easily and more safely disconnecting the king pin on the truck trailer from the fifth wheel on the truck cab.

BACKGROUND OF THE INVENTION

Semi-trailer trucks are well known throughout the world in which an independent truck trailer can interchangeably be connected to practically any desired truck cab for transporting the trailer and it contents to any desired location. While the truck cabs and truck trailer can take any one of a large variety of different forms and sizes, depending on the intended use and intended load to be transported, the interconnection between the cab and trailer has developed into a uniform standard design so that the cabs and trailer can readily be interchanged according to need. Pursuant to this standard form, the truck cab is normally provided with a chassis structure such that a portion of the truck frame extends rearwardly of the cab with one or more drive axles, upon which wheel and tires are mounted, supporting the truck cab on the road surface under the rearwardly extending portion of frame structure. A tiltable, steel disk, commonly referred to as the "fifth wheel", is horizontally disposed on the upper side of the rearwardly extending frame portion, with the fifth wheel having a diverging "V" slot extending rearwardly from an aperture at the axial center.

The truck trailer, on the other hand, is normally provided with one or more rear axles, to which wheels and tires are mounted, for supporting the rear-end of the trailer on the road surface. When interconnected, the front end of the tuck trailer is supported on the fifth wheel mounted on the rearwardly extending portion of the cab frame such that the rear cab axles support the load in the front-end portion of the trailer. A king pin extending downwardly from the under surface of the trailer near the front thereof is provided, which is adapted to be engaged within the aperture on the fifth wheel, so that the trailer can be pivotally connected to the cab and pulled thereby in an articulated manner. For friction reducing purposes, the upper surface of the fifth wheel is normally greased heavily, as in its articulating action, the forward portion of trailer undersurface must be free to pivotally rotate against the upper surface of the fifth wheel. To support the truck trailer in the absence of a cab, the front end of the trailer is normally provided with a crank-down support means disposed rearwardly of the king pin, which can be manually operated to lower the support means to a vertical orientation, to thereby support the forward end of the trailer.

To connect the truck cab to the truck trailer, the front end of the trailer must be supported on the crank-down support means, or other such support, such that the king pin extends downwardly from the front of the trailer floor spaced above the road surface by a distance sufficient to permit the truck cab to backed under the king pin. The diverging "V" slot in the fifth wheel is designed so that upon driving the truck cab in reverse, the driver can guide the "V" slot around the king pin extending downwardly from the front end of the trailer, and guide it into the aperture at the axial center of the fifth wheel, where a spring loaded locking mechanism secured to the lower side of the fifth wheel will lock the king pin in place within the aperture, thereby also holding the forward undersurface of the trailer against the upper surface of the fifth wheel. When so lock together, the truck cab and truck trailer can readily function as an articulated semi-trailer truck. The locking mechanism on the undersurface of the fifth wheel is well known in the art and need not be described here.

To disconnect the truck trailer from the track cab, an elongated release rod is horizontally disposed at the under surface of the fifth wheel which emerges through an opening in the side wall of the fifth wheel. One end of the release rod is connected to the above-mentioned spring-loaded locking mechanism, with its other end extending through an aperture or opening in the side wall of the fifth wheel, and having an eyelet at its outer end, to which a manually manipulated, pull release tool can be attached. The release rod is normally transverse to the center-line of the truck cab, so that the side wall opening and eyelet are normally located on the left side of the cab between the upper surface of the cab's left-rear tire or tires and the under surface of the trailer resting on the fifth wheel.

To physically and manually release and disengage the truck trailer from the fifth wheel, a pull release tool, which comprises an elongated steel rod having a hook at one end and a hand-grip at the other, is hooked into the eyelet at the outer end of the release rod, and the pull release tool manually pulled so that the release rod will pull on the locking mechanism to disengage the trailer king pin. When so disengaged, the truck cab can be driven in a forward direction and away from under the trailer. Obviously, the crank-down support means under the trailer must first be positioned so that the front end of the trailer will be supported on the road surface when the cab is driven away therefrom, and in ready position to permit the same or another truck cab to later be attached thereto.

While such a disengaging effort is not particularly difficult, it is not as simple and easy as could be hoped for. For example, to engage the pull release tool into the release rod eyelet, the truck operator must normally stoop over so that he can see the eyelet which is normally positioned under the bottom surface of the trailer and over the cab's rear tire or tires, and then reach therebetween to engage to hook into the eyelet. This can be unpleasant and complicated in the darkness of night, or during fowl weather situations where snow and/or ice may be packed in and around the fifth wheel or between the cab rear tires and the trailer. In addition, it is not uncommon for the pull release tool hook to slip from the release rod eyelet when not properly engaged, causing the driver to injure his back, hit his head on the trailer, or hit his knuckles, elbow, or arm against the trailer or tires. In addition further, it is not uncommon for the pull release tool be lost, stolen or misplaced, making it impossible to release the trailer until a pull release tool is located. Because of the grease that must be utilized between trailer and fifth wheel interfaces, the area in and around the fifth wheel is often rather greasy and mixed with road dirt, so that in addition to mud that may be on the cab tire surfaces and elsewhere, the above described release effort can also be a rather messy task.

In addition to the above problems, it should be noted that many of the prior art release rods are provided with a stop bar welded to the underside which functions as a lock to prevent unintentional pulling of the release rod. Specifically, the stop bar is of shorter length than the release rod so that the outer blunt end thereof will abut against the edge of the hole or aperture in the side of the fifth wheel through which release rod extends to thereby prevent the release rod from being pullable outwardly unless it is also lifted upwardly to an extent sufficient to permit the stop bar to also fit through the hole. That is to say, the hole is normally elongated in the vertical direction so that when lifted, both the release rod and stop bar will easily fit therethrough. In a like manner, the opposite blunt end of the stop bar will abut against the outer hole edge to thereby prevent the spring loaded locking mechanism from pulling the release rod inward, which in essence locks the release mechanism in the king pin release position. It should be apparent, that it is rather difficult to effect the required lifting action together with the pulling action when using the conventional pull release tool merely hooked to the eyelet of the release rod, particularly in view of the rather restricted space that may exist between the truck cab rear tires and the bottom of the trailer.

While several devices have been developed in an attempt to simplify the release effort, most such devices are merely differing types of pull release tools that can be substituted for the normal pull release tool described above. These tools normally provide some sort of configuration that will permit the tool to be disposed against a side of the trailer, trailer tires or similar surface to permit the tool be used as a pry bar, thereby prying, rather than pulling, the release rod outwardly. These devices, however, are merely differing types of manually manipulated hand tools for use in combination with the conventional release rod, and accordingly must be stored in the truck cab or elsewhere when not in use, and must be hooked-up to the release rod as any conventional pull release tool before it can be utilized to disengage the trailer from the fifth wheel. Accordingly, these devices do no eliminate the need for the driver to hook the hand tool into the eyelet, which requires that he/she stoop over so that he/she can see the eyelet, and to hook the tool to the eyelet while working in the confined space between the rear tires on the cab and the underside of the trailer. Therefore, the use of these newer tools can still be an unpleasant and complicated task in the darkness of night, or during fowl weather situations where snow, ice, mud and other such debris may be packed in and around the area in which the driver must work to make the connection. In addition, these new tool can themselves slip from the release rod eyelet when not properly engaged, and still cause the driver to injure his/her back, head, knuckles, elbow, or arm. Lastly, the use of such newer hand tools can still be lost, stolen or misplaced, making it impossible to release the trailer until a pull release tool is located.

SUMMARY OF THE INVENTION

This invention is predicated on my conception and development of a new and improved apparatus intended to be permanently mounted to the fifth wheel of a truck cab for quickly, easily and more safely disconnecting a trailer king pin from the fifth wheel of a truck cab. Accordingly, the apparatus of this invention eliminates the need for a separate tool; i.e., a pull release tool, thereby avoiding the complications and lost time that can result from a lost, stolen or misplaced release tool, and further eliminates the sometimes complicated or unpleasant task of hooking the pull release tool to the eyelet on the release rod, as noted above. In addition, the apparatus of this invention in using a lever arm to pull the release rod outwardly, can very easily be utilized to effect the necessary lifting action to disengage the stop bar as described above, making the entire release activity an effortless task. More importantly, the inventive apparatus further eliminates the possibility of injury that can result to the operator when the release tool hook slips from the release rod eyelet during the disengaging effort. Most importantly, however, the lever arm apparatus of this invention is permanently attachable to the fifth wheel so that it becomes a part thereof, and cannot therefor be lost, stolen or misplaced, and does not have to be engaged to the release rod eyelet each time the operator wishes to activate the release.

In essence, the apparatus of this invention comprises an elongated, rigid lever arm, a first end of which is pivotally attachable to a side of the fifth wheel at a location spaced from the opening through which the release rod emerges, and a second end adapted to be spaced away from the fifth wheel extending generally horizontally from the first end, and including means thereon for permanently attaching the lever arm to the elongated release rod, such that a manual, pulling motion applied to the lever arm at the second end, can cause the lever arm to be pivoted generally horizontally at the first end, thereby causing a levered pulling action on the release rod so that the release rod is pulled outwardly sufficient to disengage the king pin from the fifth wheel. The lever arm is attached as described above, so that it is disposed horizontally adjacent to the fifth wheel, parallel to the trailer floor and extending forwardly in an out-of-the-way position over the cab frame, so that it can remain permanently attached and always ready for use in disengaging any trailer connected to the fifth wheel without any need to first locate the tool, and then to hook it up as a pull release tool to the release rod.

Preferred embodiments of the invention will include a pivot link pivotally attached to the first end of the lever arm, which readily permits the lever arm to be pivotally attached to the side of the fifth wheel, and preferably, some sort of locking means that can prevent unintentional or accidental unlocking of the trailer, or even intentional unlocking by unauthorized persons. For example, to prevent unintentional unlocking, a lock tab rigidly secured to the under side of the elongated release rod, such as the prior art stop bar described above, can be provided. To prevent unlocking by unauthorized persons, a simple hasp device to hold the lever arm in the inactive position, that can be padlocked, may be all that is necessary.

OBJECTS OF THE INVENTION

Accordingly, it is a primary object of this invention to provide a new and improved lever apparatus permanently attachable to a truck cab's fifth wheel for quickly, easily and more safely disengaging the king pin of a truck trailer from the truck cab's fifth wheel.

Another primary object of this invention to provide a new and improved apparatus for quickly, easily and more safely disengaging the king pin of a truck trailer from the truck cab's fifth wheel which is permanently attached to the fifth wheel and thereby eliminates the need to repeatedly engage a release tool onto the release rod eyelet each time a release is desired.

A further primary object of this invention to provide a new and improved apparatus as a part of a truck cab's fifth wheel for quickly, easily and more safely disengaging the king pin of a truck trailer from the truck cab's fifth wheel which is permanently attached to the cab's fifth wheel and cannot, therefore, be lost, stolen or misplaced.

Still another primary object of this invention to provide a new and improved apparatus for quickly, easily and more safely disengaging the king pin of a truck trailer from the truck cab's fifth wheel which is permanently attached to the cab's fifth wheel and release rod which eliminates the possibility of injury to the operator that can result when a pull release tool hook slips from the release rod eyelet.

A still further object of this invention is to provide a new and improved fifth wheel for a truck cab having a lever arm extending horizontally forward thereof for quickly, easily and more safely disengaging the king pin of a truck trailer from the truck cab's fifth wheel.

These and other objects and advantages of this invention will become apparent after a full reading of the following detailed description, particularly when read in conjunction with the attached drawings as described below.

DESCRIPTION OF THE PREFERRED EMBODIMENT OF THE INVENTION

Figure 2:
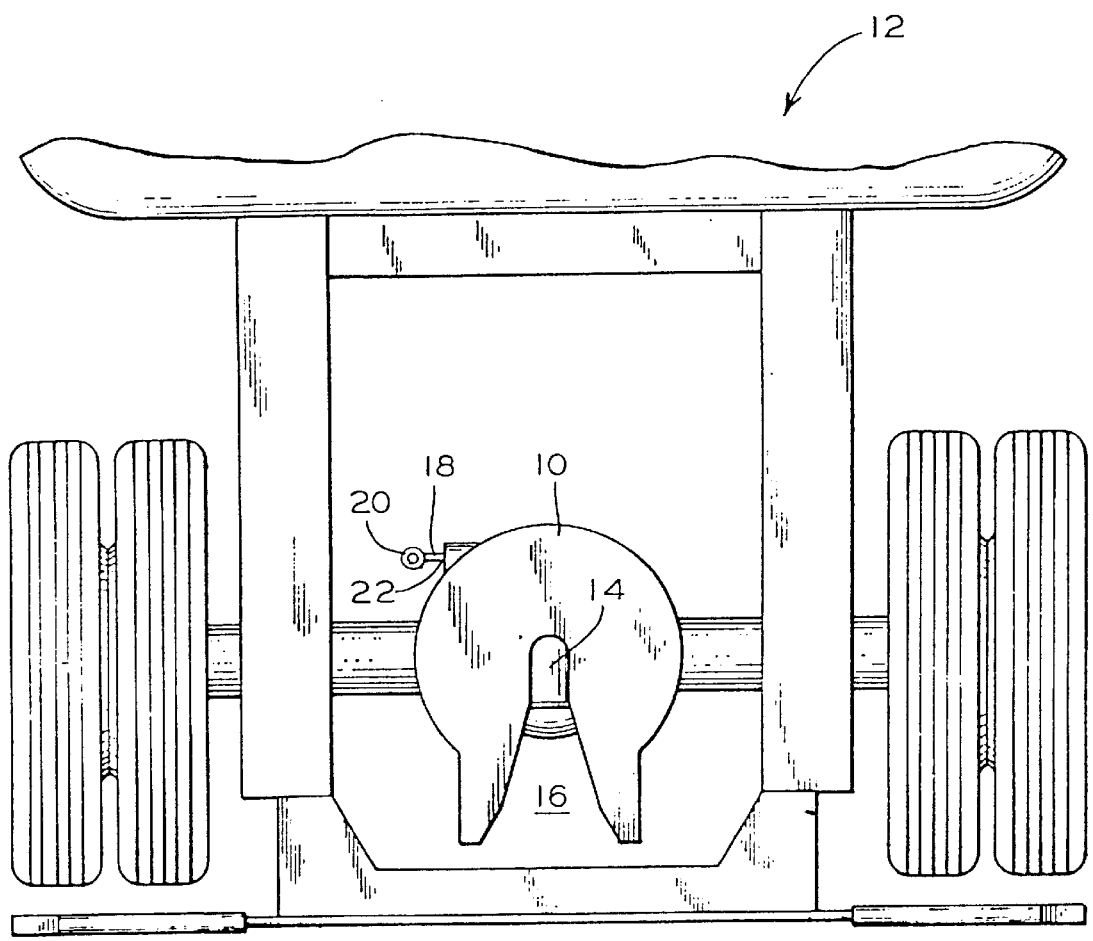
FIG. 2 is a partial plan view of the rear portion of a truck cab showing the fifth wheel thereon pursuant to the prior art.

Reference to FIG. 2 will illustrate the fifth wheel on the rear of a truck cab pursuant to the existing prior art. As can be seen, the fifth wheel 10, mounted over the rear tires of truck cab 12, is provided with an aperture 14 at the axial center with a diverging "V" slot 16 extending rearwardly from aperture 14. A release rod 18, having an eyelet 20 at its outer end, extends through an aperture 22 in the left-hand side of the cylindrical side wall of the fifth wheel 10. Pursuant to prior art practices a release tool (not shown), which merely comprises an elongated steel rod, about three feet in length having a hook at one end and a hand grip at the other, is utilized to disengage a trailer's king pin from the fifth wheel, which involves the effort of engaging the hook on the release tool (not shown) into the eyelet 20, and pulling on the release tool so that the release rod 18 is pulled outwardly from the fifth wheel 10, which will effect a disengagement of the king pin from the fifth wheel locking mechanism (not shown). As noted above, the effort of engaging the hook into eyelet 20, can be difficult under certain circumstances, and the hook can become disengaged at times during the pulling action which can result in injury to the operator.

Figure 1:
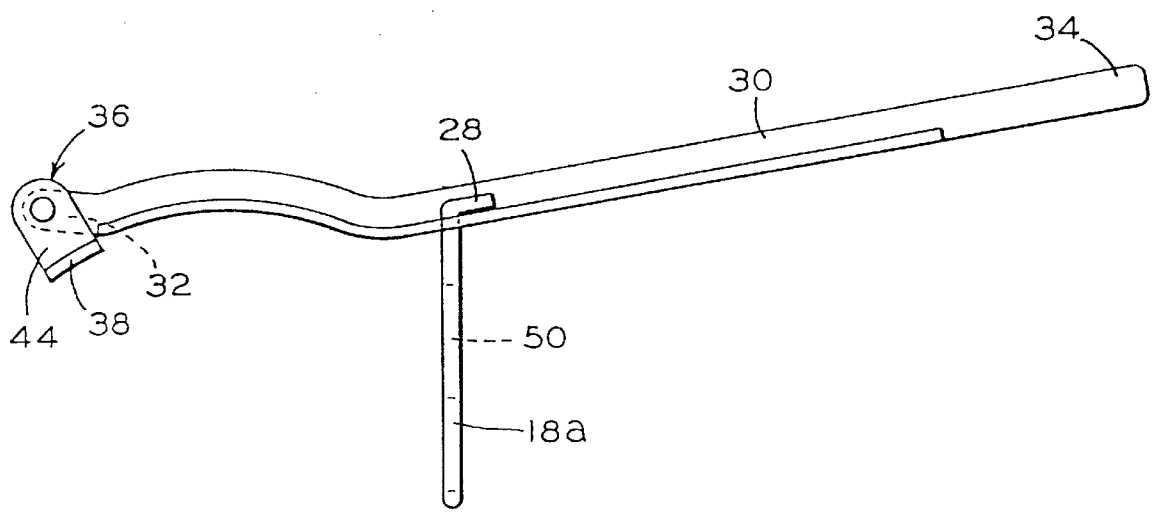
FIG. 1 is a plan view of a presently preferred embodiment of the lever apparatus of this invention for disconnecting a trailer king pin from the fifth wheel of a truck cab, showing the lever arm, the preferred release rod, and the pivot link.

Reference to FIG. 1 will illustrate a presently preferred embodiment of this invention, wherein the fifth wheel 10 is not altered from the prior art fifth wheel 10 as shown in FIG. 2. The only prior art element altered is the release rod 18a, which, instead of an eyelet 20 at its outer end, is provided with means, such as a hook 28 to engage the end of the release rod 18a to the lever arm 30, described below.

The lever arm 30 comprises a rigid, elongated lever, such as a length of angle iron, having a first end 32 pivotally attachable to a side of fifth wheel 10 at a location spaced from the opening 22 through which the release rod 18a extends. As specifically shown, a pivot link 36 is boltable to the side of fifth wheel 10, which is provided with a vertical flange 38 having an aperture (not shown) therethrough through which a bolt 40 (FIG. 3) can be inserted to fasten pivot link 36 to the side of fifth wheel 10. It should be noted that all prior art fifth wheels are already provided with a threaded bolt hole (not shown) in the side of fifth wheel 10 which is about two feet counter-clockwise from the hole 22 through which release rod 18 emerges, at which pivot link 36 can be attached. While the purpose for bolt hole (not shown) is not known, it is assumed that such bolt holes are utilized in the manufacture of the fifth wheel 10, or perhaps in the assembly and installation of the fifth wheel onto the truck cab chassis 12. In any event, such a bolt hole is always present and is not utilized in the normal operation and use of the articulated semi-trailer truck, so that fastening the pivot link 36 thereto will not interfere with normal operation of the truck cab and truck trailer. In addition to vertical flange 38, pivot link 36 is also provided with at least one horizontal flange 44 to which the first end 32 of lever arm 30 is pivotally bolted. Preferably, a pair of parallel horizontal flanges 44 are provided with the lever arm 30 pivotally bolted therebetween.

Figure 4:
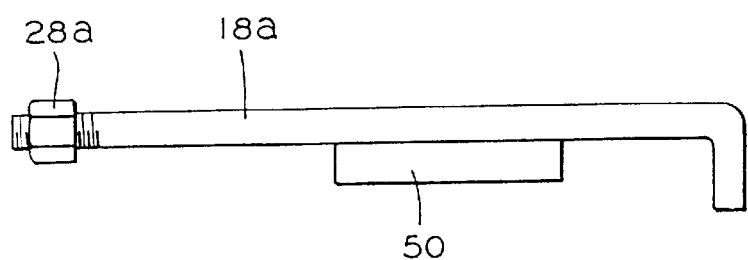
FIG. 4 is a side view of the preferred release rod substantially like that shown in FIG. 1 but having a threaded nut rather than a hook for holding the outer end thereof to the lever arm.

The lever arm 30 should be configured such that a portion thereof will extend horizontally adjacent to release rod 18a, with the second end 34 of lever arm 30 spaced away from the fifth wheel 10 extending generally horizontally from said first end 32. Means, such as hook 28 at the end of release rod 18a, is provided for the purpose of attaching release rod 18a to lever arm 30. Obviously, hook 28 could be replaced with a simple nut 28a (as shown in FIG. 4), which can be threaded onto the end of release rod 18a. Although that portion of lever arm 30 positioned between pivot link 36 and release rod 18a can curved, as shown, so that it can generally fit rather closely to the cylindrical side surface of fifth wheel 10, it has been found that a straight length lever arm may work as well. That portion of lever arm 30 extending from release rod 18a to the second end 34 can have any desired configuration, but preferably should be such that the second end 34 is not only spaced away from the fifth wheel 10 extending generally horizontally from said first end 32, but is such that the second end 34 is at a position where it can be easily seen and grasped, such as a position where it will not be directly under the trailer (not shown) or directly over the truck cab rear tire or tires. Obviously, second end 34 should not be at a location where it extends beyond the side surfaces of the truck trailer (not shown) where it could be side-swiped in tight traffic, or cause injury to anyone passing by the truck or standing adjacent to the moving truck. Pursuant to the embodiment shown, the second end 34 is therefore, preferably positioned somewhat forward of the normally rounded forward wall of the trailer (not shown) so that it can be easily seen, grasped and manipulated without being in a position where it becomes a hazard to bystanders. If preferred, a hand grip can be provided at the second end 34 to facilitate such manipulation. If in fact the lever arm 30 is fabricated of angle iron as shown, it is desired that the vertical flange portion be removed at the outer end 34 so that only the horizontal flange portion remains to function as a hand grip, substantially as shown in FIGS. 1 and 3.

Figure 3:
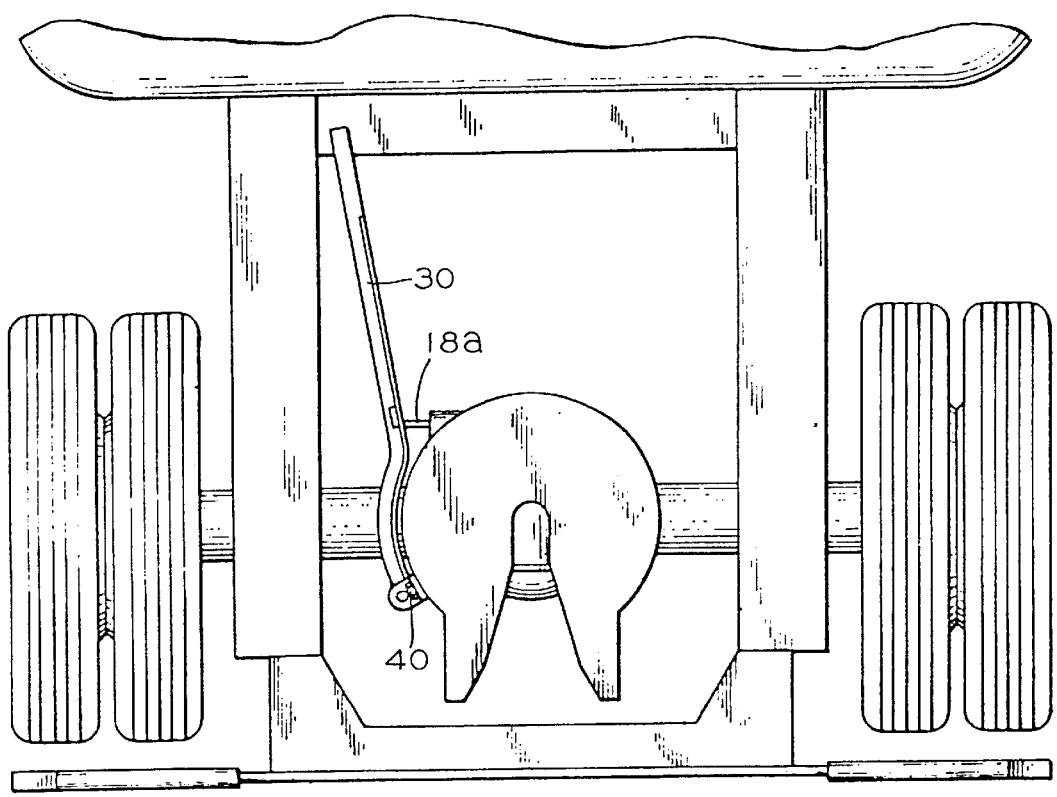
FIG. 3 is a partial plan view identical to that of FIG. 2, except that it shows the lever apparatus of this invention as preferably installed onto the fifth wheel.
Figure 6:
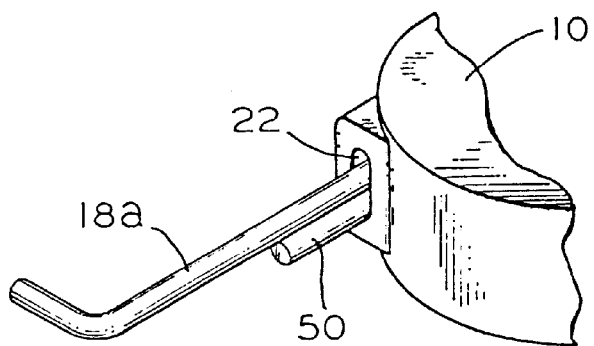
FIG. 6 is identical to FIG. 5 except that it shows how the release rod has to be lifted to permit a stop bar attached thereto to pass through hole and activate the release mechanism.
Figure 7:
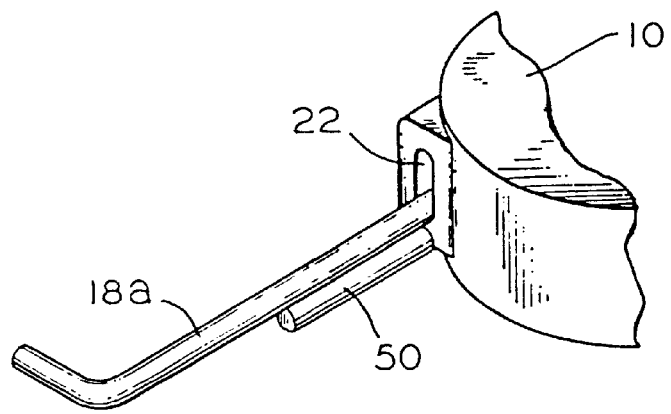
FIG. 7 is identical to FIGS. 5 and 6 except that it shows the release rod fully withdrawn from the fifth wheel with the stop bar locked it in the release position.

As should be apparent from the above description, the apparatus of this invention, when properly installed as shown in FIG. 3, will be rather simple to operate. Specifically, to disengage a trailer from the fifth wheel 10, the driver must merely grasp the outer end 34 of lever arm 30, and pull outwardly, causing lever arm 30 to be pivoted about the first end 32, thereby causing lever arm 30 to also pull release rod 18a outwardly from fifth wheel 10, to such extent that the king pin (not shown) on trailer (not shown) is unlatched from fifth wheel 10. In addition, it should be quite apparent that if the distance between the pivot point at the first end 32 and the attachment to release rod 18a is relatively short as shown, in contrast to the distance between the attachment to release rod 18a and second end 34, that the arrangement will provide a lever action having a mechanical advantage as compared to a straight out pulling action pursuant to the prior art. Therefore, the manual pulling force required to operate the apparatus of this invention as described above, will be less than the manual pulling force required with the prior art technique utilizing a pull release tool. In addition to the above considerations, it should be quite apparent that if the release rod 18a is provided with a stop bar (as shown in FIGS. 6 and 7), that the required lifting effort will also be considerably easier.

Figure 5:
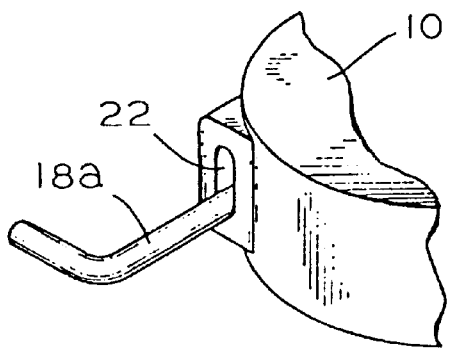
FIG. 5 is an isometric view showing a portion of the fifth wheel and the outer end of the release rod emerging through the hole in the side of the fifth wheel as it appears when the locking mechanism is in the lock position.

In view of the simplicity of operation, as described above, it is preferable that some locking means be included to prevent either or both unintentional unlocking of the trailer, or intentional unlocking by unauthorized persons. For example, to prevent unintentional unlocking, a lock tab such as a stop bar 50 (FIGS. 5 and 6) as described above is preferably included. Accordingly, to effect an intentional release of the king pin, it will therefore be necessary that in addition to the pulling force, the release rod 18a be lifted vertically by the lever arm 30 sufficiently to permit the stop bar 50 to be raised sufficiently to pass through the opening 22 in the side of the fifth wheel 10 concurrently with the release rod 18a. Indeed, hole 22 in most fifth wheels is normally elongated in the vertical direction as shown in FIGS. 5–7, so that when lifted, both release rod 18a and stop bar 50 can readily pass through hole 22. Since such a release effort will require both a pulling and a lifting action, it is unlikely that such a release could be effected accidentally. Reference to FIG. 5 will better illustrate how the release rod 18a would appear extending through hole 22, with stop bar (not visible) abutting against the inside surface of fifth wheel 10 to prevent any outward pulling of release rod 18a. Reference to FIG. 6, in contrast, illustrates the release rod 18a after having been lifted so that release rod 18a and stop bar 50 can both be pulled through hole 22 to effectively release the king pin from the fifth wheel. If preferred, the inside blunt end of stop bar 50 can be spaced sufficiently from the outer blunt end so that it too will abut against the fifth wheel, in this case against the outer surface, to similarly hold release rod 18a in place to prevent it from being forced back into hole 22, thereby allowing the fifth wheel to be blocked in the kin pin release position. Reference to FIG. 7 will illustrate this situation, in contrast to those shown in FIGS. 5 and 6. Accordingly, the stop bar 50 as shown, will not only prevent any unintentional pulling of the release bar 18a, but will further prevent any unintentional re-engagement of the locking mechanism after it has been activated to disengage the king pin from the fifth wheel.

To prevent unlocking by unauthorized persons, any one of a great number of simple locking devices could be incorporated. For example, a simple hasp device (not shown) could be provided to hold the lever arm 30 in a locked and inactive position, with the hasp device being of the type that can be padlocked or otherwise key-locked to prevent unauthorized unlocking and operation of the lever arm 30. Such a hasp means or other locking device could be incorporated into the truck cab chassis or a side wall of the trailer in any of a great number of possible arrangement.

While a simplified and preferred embodiment of the apparatus of the present invention has been described in detail above, it should be apparent to persons having ordinary skills in mechanical arts that various other embodiments, adaptations and modifications of the invention could be made without departing from the spirit and scope of the invention. For example, the relative positions of the pivotal point at end 32 and the pulling attachment to release rod 18a could be reversed so that the pivot point is between second end 34 and the attachment to release rod 18a. With such an arrangement, a pushing action at the second end 34, in contrast to a pulling action, would cause release of the king pin. Another possible modification would be to provide a variable length lever arm 30, or a sliding extension member thereon, to facilitate its attachment to a variety of differing truck cab arrangements, as well as provide an increase in leverage where it may be helpful. Obviously too, the lever arm 30 could take a number of differing forms, as long as it the lever arm 30 can be moved manually one way or the other to effect a lever action on the release rod 18a. In addition to these possible modifications, any of the above described locking means could be incorporated to prevent accidental and unauthorized activation of the lever arm 30. Clearly, therefore, many other modifications and embodiments could be developed and utilized without departing from the spirit of the invention.

We claim:

1. A manual release in combination with a fifth wheel disposed on a truck cab for disengaging a king pin disposed on a truck trailer from such fifth wheel having an elongated release rod extending outwardly therefrom through an opening formed in a side wall portion of such fifth wheel and adapted to be pulled outwardly to disengage such king pin from such fifth wheel, the combination comprising:

(a) an elongated, rigid lever arm, a first end of said lever arm is pivotally attached to such side wall portion of such fifth wheel at a location spaced from such opening through which such release rod extends such that a second end of said lever arm is spaced away from such fifth wheel and extends generally horizontally from said first end;

(b) means disposed on said lever arm for attaching said lever arm to such release rod, such that manual movement of said second end of said lever arm will cause said lever arm to be pivoted generally horizontally about said first end and in a direction away from the fifth wheel, to cause such release rod to be pulled outwardly sufficient to disengage such king pin from such fifth wheel, and (c) a lock tab rigidly secured to a side of such elongated release rod, said lock tab adapted to abut against an inside surface of such fifth wheel to prevent pulling of such release rod and release of such king pin unless such release rod is lifted vertically by said lever arm sufficient to permit said lock tab to pass through such opening in the side of the fifth wheel concurrently with such release rod.

2. A manual release apparatus, according to claim 1, in which said lock tab comprises an elongated stop bar rigidly attached in a parallel relationship to the bottom of said release bar, each end of said stop bar adapted to abut against a surface of such fifth wheel to prevent movement of such release bar unless such release bar is lifted vertically by such lever arm sufficient to permit said stop bar to pass through such opening in the side of such fifth wheel concurrently with such release rod.

3. A manual release apparatus in combination with a fifth wheel of a truck cab for disengaging a king pin on a truck trailer from such fifth wheel wherein such fifth wheel has a release rod extending generally horizontally outwardly through an opening in a side wall of such fifth wheel adapted to be pulled outwardly to disengage such king pin from such fifth wheel, the combination comprising; an elongated, rigid lever arm having a first end pivotally attached to a side of such fifth wheel at a location spaced from such opening through which such release rod extends, such that a second end of said lever arm is spaced away from such fifth wheel extending generally horizontally from said first end, means for attaching said lever arm to such release rod at a point between said first and second ends of said lever arm, such that a manual movement of said second end of said lever arm will cause said lever arm to be pivoted generally horizontally about said first end, and cause such release rod to be pulled outwardly sufficient to disengage such king pin from such fifth wheel, a lock tab rigidly secured to a side of such release rod, said lock tab adapted to abut against an inside surface of such fifth wheel to prevent pulling of such release rod and release of such king pin unless such release rod is lifted vertically by said lever arm sufficient to permit said lock tab to pass through such opening in the side of the fifth wheel concurrently with such release rod.

4. A manual release apparatus, according to claim 3, in which said lock tab comprises an elongated stop bar rigidly attached in a parallel relationship to the bottom of said release bar, each end of said stop bar positioned to abut against an inside surface of such fifth wheel to prevent movement of such release bar unless such release bar is lifted vertically by such lever arm sufficient to permit said stop bar to pass through such opening in the side of such fifth wheel concurrently with such release rod.

5. A manual release apparatus in combination with a fifth wheel on a truck cab for disengaging a king pin on a truck trailer from such fifth wheel wherein such fifth wheel has a release rod extending generally horizontally outwardly through an opening in a side wall of such fifth wheel adapted to be pulled outwardly to disengage such king pin from such fifth wheel, the combination comprising: an elongated, rigid lever arm having a pivotal link attached to a first end, said pivotal link attached to a side of such fifth wheel at a location spaced from such opening through which such release rod extends, such that a second end of said lever arm is spaced away from such fifth wheel extending generally horizontally from said first end, means for attaching said lever arm to such release rod at a point between said first and second ends of said lever arm, such that a manual movement of said second end of said lever arm will cause said lever arm to be pivoted generally horizontally about said first end, causing such release rod to be pulled outwardly sufficient to disengage such king pin from such fifth wheel, and a lock tab rigidly secured to a side of said release rod, said lock tab adapted to abut against an inside surface of such fifth wheel to prevent pulling of such release rod and release of such king pin unless such release rod is lifted vertically by said lever arm sufficient to permit said lock tab to pass through such opening in the side of the fifth wheel concurrently with such release rod.

6. A manual release apparatus, according to claim 5, in which said lock tab comprises an elongated stop bar rigidly attached in a parallel relationship to the underside of said release rod, an outer end of said stop bar adapted to abut against an inside surface of such fifth wheel to prevent pulling of such release rod and release of such king pin unless such release rod is lifted vertically by said lever arm sufficient to permit said stop bar to pass through such opening in the side of the fifth wheel concurrently with such release rod, and an inner end of said stop bar adapted to abut against the outer surface of such fifth wheel to prevent such release rod from being forced back into said opening unless such release rod is lifted vertically by said lever arm sufficient to permit said stop bar to pass through such opening in the side of the fifth wheel concurrently with such release rod.

7. A manual release apparatus, according to claim 5, in which said second end of said lever arm is adapted to extend beyond a peripheral edge of such trailer.

8. A manual release apparatus, according to claim 5, in which said second end of said lever arm is adapted to extend forward of any upper surfaces of any rear tires mounted on such truck cab.

9. A manual release apparatus, according to claim 5 in which said second end of said lever arm is adapted to extend beyond a peripheral edge of such trailer.

* * * * *